United States Patent [19]

Wellman et al.

[11] Patent Number: 5,681,117
[45] Date of Patent: Oct. 28, 1997

[54] RETAINER FOR REEL TOOTHBAR BEARING

[75] Inventors: Stanley Paul Wellman; Melvin William Keller, both of Ottumwa, Iowa

[73] Assignee: Deere & Company, Moline, Ill.

[21] Appl. No.: 695,831

[22] Filed: Aug. 9, 1996

[51] Int. Cl.$^6$ ................................................. F16C 17/02
[52] U.S. Cl. ........................................................ 384/441
[58] Field of Search ................................ 384/441, 428, 384/438, 440, 435, 537

[56] References Cited

U.S. PATENT DOCUMENTS 3,771,846  11/1973  Bass et al. .
5,007,235  4/1991  Nickel et al. .
5,357,868  10/1994  Maas ............................................. 384/441
5,475,275  12/1995  Dohogne et al. ............................ 384/441

Primary Examiner—Lenard A. Footland

[57] ABSTRACT

A bearing or bushing retainer comprises two identical, separate segments which are generally c-shaped so as to permit the segments to each be removed from a cylindrical split plastic bearing mounted on a reel toothbar once bolts holding the two segments together are released and the segments moved axially relative to each other so as to disengage respective axially extending tabs of the segments from gaps defined between opposite ends of the segments. The segments have a relatively heavy cross section and are made of sintered powdered metal of relatively high carbon content, and are heat treated thereby resulting in a part having a long wear life and having a natural lubricity resulting in the extension of the wear lives of the retainer and of the bearing retained thereby.

5 Claims, 2 Drawing Sheets

RETAINER FOR REEL TOOTHBAR BEARING

BACKGROUND OF THE INVENTION

The present invention relates to reels for agricultural implements and more particularly relates to retainers for bearings or bushings used in mounting reel toothbars to support spiders of such reels.

A typical reel for an agricultural implement includes a central support drum or shaft having a plurality of spiders fixed thereto at axially spaced locations, the spiders supporting a plurality of equiangularly spaced toothbars. Reel teeth are mounted at spaced locations along the length of each toothbar for sweeping against and first positioning crop for being severed by a cutterbar and then sweeping the cut crop rearwardly toward further crop feeding or processing elements. The toothbars are each mounted for being oscillating about their respective longitudinal axes as dictated by a follower including an arm fixed to one end of each toothbar and carrying a roller received in a cam track fixed to a support at one end of the reel.

A known and widely used structure for coupling reel toothbars to spiders includes a retainer or housing formed as a sheet metal stamping including a cylindrical section, which surrounds and captures a split plastic bushing or bearing received on the toothbar, and a flange which is bolted to the spider. A specific embodiment of this type of arrangement is disclosed in U.S. Pat. No. 3,771,846, granted to Bass et al. on 13 Nov. 1973. While a worn split plastic bushing may be replaced without requiring removal of any of the reel teeth, replacement of a worn sheet metal retainer requires removal of reel teeth from the toothbar and may require the toothbar to be disconnected from its support spiders in order to permit the retainer to be slipped off the end of the toothbar.

A known bearing or bushing assembly for eliminating the servicing problem just described is disclosed in U.S. Pat. No. 5,007,235, issued to Nickel et al. on 16 Apr. 1991. While this patented design still includes a stamped sheet metal retainer or housing, the need for replacing the housing is reduced or eliminated by providing a metal bushing or insert constructed from a pair of generally semi-circular sections that are abutted together to make a complete annulus that is held in sliding engagement with the split bearing by the retainer. This arrangement has the drawback of requiring extra parts.

Also known in the prior art is a light weight reel including plastic toothbars mounted to spiders by two-piece, plastic toothbar mounting flange structures which can be separated from the toothbar once unbolted from each other and the spider. One drawback of this structure is that no bushing or bearing is used and that in heavy applications in sandy conditions, for example, poor retainer and toothbar life results.

SUMMARY OF THE INVENTION

According to the present invention, there is provided an improved assembly for mounting a reel toothbar to a toothbar spider or support.

An object of the invention is to provide a reel construction including a toothbar-to-spider connection including a retainer or housing for holding a split plastic bearing or bushing in place on the toothbar, with the retainer being replaceable without requiring teeth to be removed from the toothbar or the toothbar to be disconnected from all of the spiders supporting it.

A more specific object of the invention is to provide a reel construction as defined in the immediately preceding object wherein the retainer includes a pair of interlocking metal segments of relatively heavy cross section, which allow the retainer to be replaced without requiring teeth to first be removed from the toothbar.

Yet a more specific object of the invention is to provide a retainer, as defined in the immediately preceding object, wherein the pair of segments of the retainer are identical.

These and other objects of the invention will become apparent from a reading of the ensuing description together with the appended drawings.

DESCRIPTION OF THE PREFERRED EMBODIMENT

Figure 1:
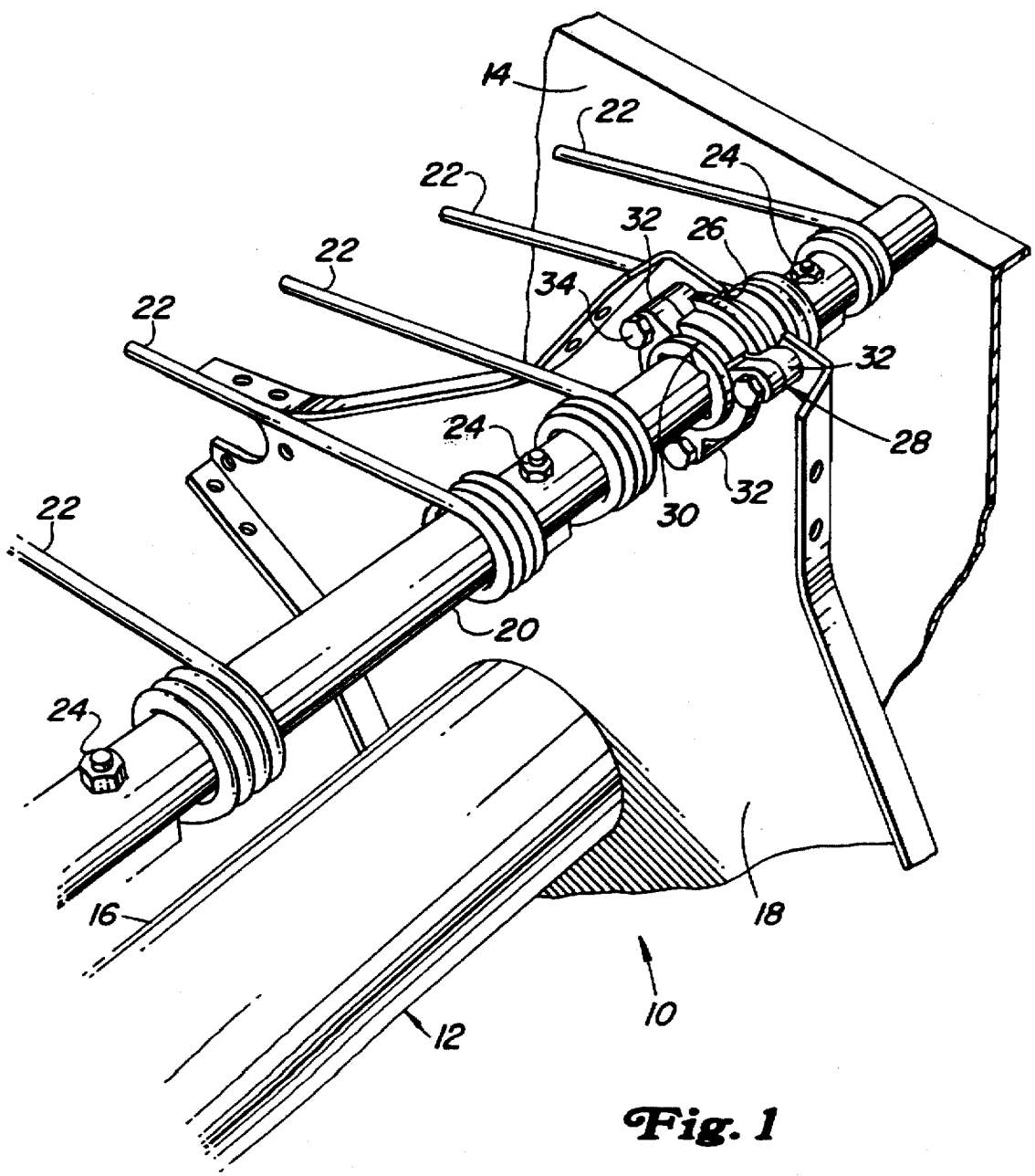
FIG. 1 is a left front perspective view showing a portion of a mower conditioner reel embodying the present invention.

Referring now to FIG. 1, there is shown a portion of a header 10 of an agricultural implement, such as a mower-conditioner, the header 10 including a reel 12 extending transversely between spaced sidewalls of the header, with only a left-hand sidewall 14 being shown. The reel 12 includes a central elongate tubular body 16 provided at its opposite ends with axially outwardly projecting support shafts (not shown) that are journalled in bearings mounted to the header sidewalls. Welded to the tubular body 16 at axially space locations therealong are a plurality of spiders 18 (only one shown). Extending parallel to the tubular body 16 and supported by the spiders 18 at equiangularly spaced locations about the tubular body 16 are four toothbars 20 (only one being shown). (only one being shown). Respectively mounted at equally spaced locations along each toothbar 20 are a plurality of double-coil, spring steel teeth 22, with the coils of each tooth being received on the toothbar and secured in place by clamping bolt assembly 24 which engages a looped portion (not shown) joining the double coils.

Figure 2:
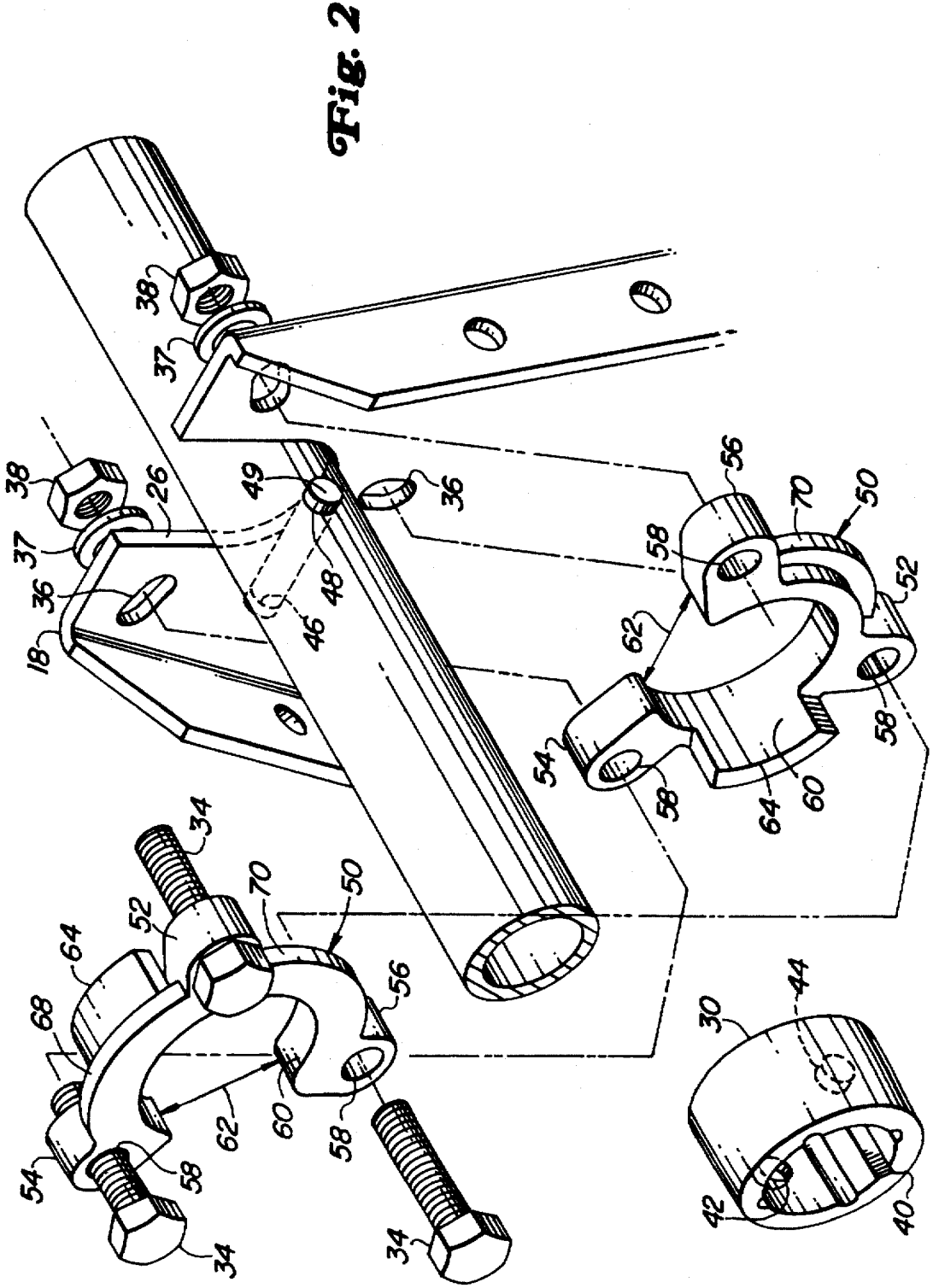
FIG. 2 is an exploded view of a representative bearing retainer showing its relationship to the toothbar and a retained split plastic bushing or bearing.

Referring now also to FIG. 2, there is shown a typical connection of one of the toothbars 20 with one of the spiders 18. Specifically, the toothbar 20 is received within a u-shaped notch 26, provided in the spider 18, and held in place by a bearing retainer 28 encircling a split, plastic bearing or bushing 30 received on the toothbar 20. The bearing retainer 28 has three equiangularly spaced, radially outwardly extending, apertured mounting lugs 32 respectively receiving a set of three mounting bolts 34 projecting through respective elongated holes 36, located in the spider 18, the mounting bolts 34 each having a washer 37 and nut 38 received thereon.

In further detail, shown only in FIG. 2, it can be seen that the bushing 30 is split, as at 40, for permitting the bearing to be bent or distorted so as to widen the split sufficiently for permitting passage of the toothbar 20 when either installing or removing the bearing 30. An interior surface of the bearing 30 is provided with diametrically opposite blind bores 42 and 44. Diametrically opposite holes 46 and 48 are provided in the toothbar 20, and opposite ends of a pin 49 received in and extending outwardly beyond the holes 46 and 48 are respectively received in the blind bores 42 and 44 for keeping the bearing 30 from rotating relative to the toothbar 20 for preventing wear at the interface of the two parts.

The bearing or bushing retainer 28 is constructed so as to be removable from the toothbar 20 without first requiring removal of any of the reel teeth 22. Specifically, the retainer 28 is constructed of two identical, substantially c-shaped segments 50, with each segment 50 including a middle mounting lug portion 52 spaced equally from opposite end mounting lug portions 54 and 56, respectively, the lug portions each being provided with a mounting hole 58. Each retainer segment 50 includes an inner cylindrical bearing receptacle section 60 embracing an exterior cylindrical surface of the split bearing 30 and extending arcuately through an angle of approximately 275° about a central axis of the receptacle section 60. A gap 62 is thus defined between opposite ends of the receptacle section 60, the dimension of the gap 62 being just large end lug portions 52 and 54, respectively, the receptacle section 60 includes an axial extension forming an arcuate tab 64 having an axial dimension approximately equal to that of the remainder of the receptacle section 60, and having an arcuate dimension substantially equal to the gap 62 with one of the segments 50 being inverted relative to the other with the tab 64 of one being received in the gap 62 of the other so as to form a substantially continuous area of contact for the exterior of the bearing 30. It is to be noted that when the segments 50 are placed side-by-side with their respective tabs 64 located within their respective gaps 62, the respective end lug portions 54 will be aligned to form one of the lugs 32, while the middle and end lug portions 52 and 56, respectively, of one of the segments 50, will be aligned with the end and middle lug portions 56 and 52, respectively, of the other of the segments 50 to form second and third ones of the mounting lugs 32. A first annular stiffener rib 68 extends arcuately between respective base areas of the middle lug portion 52 and end lug portion 54, and a second annular stiffener rib 70 extends between respective base areas of the middle lug portion 52 and end lug portion 56. The ribs 68 and 70 have an axial width less than half the width of the lug portions 52, 54 and 56.

It is to be noted that the retainer segments 50 are each constructed as a robust part of relatively heavy cross section, as compared to a stamped sheet metal retainer, and is preferably made of powdered metal that is heat treated to increase hardness and strength, thus increasing wear life. In addition, the powdered metal has a relatively high carbon content resulting in the carbon acting as a lubricant to even further increase the respective wear lives of the retainer 28 and bearing 30.

Replacement of a given bearing 30 and bearing retainer 28 may be accomplished by first disconnecting the bearing retainer 28 from its associated spider 18 by removing the nuts 38 from the set of bolts 34. The bearing retainer 28 is then slid axially beyond the split plastic bearing 30 contained therein. The opposite ends of the bearing 30 are then spread apart sufficiently for permitting the toothbar 20 to pass between the ends. At this time the ends of the pin 49 will be out of the blind bores 42 and 44 with movement of the bearing 30 perpendicular to the axis of the toothbar 30 resulting in its removal from the toothbar.

Removal of the bearing retainer 28 from the toothbar 20 is then accomplished by first moving the retainer segments 50 axially relative to each other a distance sufficient to withdraw the tabs 64 from the gaps 62 and then moving the segments radially relative to the toothbar 20 a distance sufficient for the toothbar to pass through the gaps 62. Reinstallation of a replacement bearing 30 and retainer 28 may be accomplished by reversing the above-mentioned removal steps.

We claim:

1. In a connection mounting a toothbar of an agricultural implement reel to a spider of the reel wherein the connection includes a bearing received about the toothbar and including a cylindrical outer surface, and a metal bearing retainer having said bearing received therein and including a cylindrical inner surface slidably engaged with said cylindrical outer surface of said bearing, and said bearing retainer being bolted to said spider, the improvement comprising: said bearing retainer being constructed of separate first and second bearing retainer segments of relatively heavy cross section; said first and second bearing retainer segments respectively including first and second cylindrical portions cooperating to define said cylindrical inner surface of said retainer; and said first and second bearing retainer segments being substantially c-shaped and respectively including first and second gaps leading to said first and second cylindrical surface sections and being dimensioned for permitting said toothbar to pass therethrough.

2. The connection defined in claim 1 wherein said first and second bearing retainer segments are identical.

3. The connection defined in claim 2 wherein said first and second cylindrical portions of said first and second bearing retainer segments respectively extend angularly at least 240° about respective central axes of said cylindrical portions, with said first and second gaps respectively being between opposite ends of said first and second cylindrical portions; and each cylindrical portion including an axially extending section defining a tab, with the tab of one bearing retainer segment being located in said gap of the other bearing retainer segment and vice-versa.

4. A bearing retainer segment for being interlocked with a like bearing segment for defining a cylindrical bearing receptacle, comprising: a generally c-shaped body including an inner cylindrical bearing receptacle portion extending arcuately at least 240° about a central axis of said receptacle portion, thereby defining a gap between opposite ends of said bearing receptacle portion; and said bearing receptacle portion including an axial extension defining an axially projecting tab having a chordal dimension, between annularly spaced edges thereof, which is slightly less than the dimension of said gap, whereby, when said bearing retainer segment is disposed side-by-side with a like bearing retainer segment, which is inverted relative to said bearing retainer segment, the tabs of the respective bearing retainer segments are received in the gaps of the respective bearing retainer segments thus interlocking the bearing retainer segments together.

5. The bearing retainer segment defined in claim 4 and further including at least three radially projecting, apertured lug portions spaced angularly equidistant from each other about said central axis, whereby, when said bearing retainer segment is disposed side-by-side with a like bearing retainer segment, the lug portions of the respective bearing retainer segments cooperate to define three lugs adapted for receiving mounting bolts for securing said segments to each other and to a spider of an agricultural implement reel.

* * * * *